April 3, 1928.
O. CHRISTENSEN
1,664,967
SELF CLEANING OIL BURNER
Filed Feb. 3, 1926
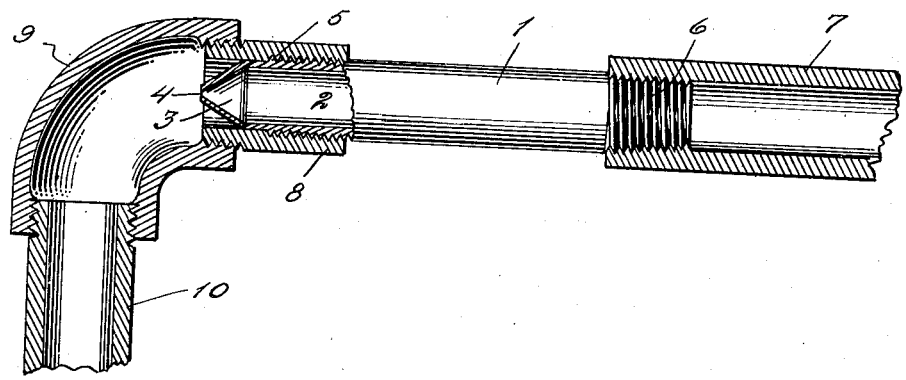
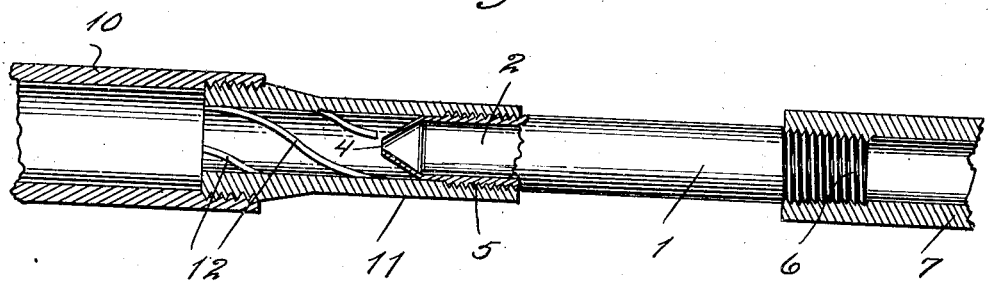
Witness
Inventor
Oscar Christensen
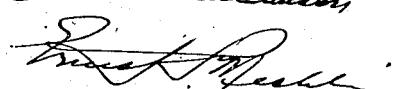
his Attorney Patented Apr. 3, 1928.

1,664,967

UNITED STATES PATENT OFFICE.

OSCAR CHRISTENSEN, OF BALTIMORE, MARYLAND, ASSIGNOR TO LOCKE INSULATOR CORPORATION, OF BALTIMORE, MARYLAND, A CORPORATION OF MARYLAND.

SELF-CLEANING OIL BURNER.

Application filed February 3, 1926. Serial No. 85,772.

The invention relates to devices for cleaning or purifying liquids by removing sediment and other solid foreign matter therefrom.

The object of the invention, generally stated, is to provide means adapted for interposition within a conduit, pipe or the like in a position directed toward the flow of liquid therethrough, the device being so constructed and arranged that the foreign matter in the liquid will eddy about and be deposited upon the end of the device instead of passing through it along with the liquid.

An important object of the invention is to provide a device of this character which may be inserted within an oil or gas line, or in fact any liquid line and employed in combination with means acting to conduct the liquid thereto in a more or less turbulent condition so as to produce a swirl or eddy which will result in depositing the foreign matter upon the exterior of the end of the device.

A more specific object is the provision of a device of this character which is particularly well adapted for use in connection with fuel lines such as the oil pipe leading to the burners of kilns, furnaces or the like, these possible uses being mentioned only by way of illustration as there is no limitation desired as to the exact mode or place of employment.

Another object of the invention is the provision of a device of this character which may be used in any position provided the active end is directed toward the current or flow of liquid.

To the attainment of the foregoing and other objects and advantages such as simplicity, cheapness, efficiency and the general improvement of the art, the invention consists in the details of construction and the arrangement and combination of parts to be hereinafter more fully described and claimed, and illustrated in the accompanying drawing in which:

Figure 1 is a longitudinal section through a liquid conducting line showing the device interposed therein and acting in combination with a right angle bend or elbow, and Figure 2 is a similar view showing a modification in which a spiral approach member is used in combination with the device.

Referring to the drawings in detail, I have shown the device as comprising an elongated pipe or tubular member 1 which may be of any desired length and diameter, depending upon the particular place where it is to be used. This tubular member is of course provided with a bore or passage 2 and has one end 3 of conical shape and closed except for a central orifice 4 of relatively small diameter as compared with the tubular member itself. Near the conical end, the tubular member 1 is preferably threaded as indicated at 5 and the other end is represented as threaded at 6 in order that the device may be mounted in or connected with a conduit or pipe line.

In both figures the tubular member 1 is shown as having its threaded end 6 screwed into a pipe 7 and its other end screwed into a pipe section 8. While it is specified that screw threads constitute the attaching or connecting means, it should be distinctly understood that any equivalent means may be provided instead, if preferred.

I have discovered that it is advisable to employ means in combination with the device for conducting liquid thereto in a turbulent condition. It is of course possible to accomplish this in different ways, probably the simplest of which is to provide a bend in the pipe line in advance of and comparatively close to the device. In Figure 1 I have disclosed an elbow 9 connected with the pipe section or member 8 and of course connected with the supply pipe 10 through which the liquid passes, the impingement of the liquid against the elbow creating sufficient disturbance that an eddy will be formed about the conical end 3 of the device, the particles of grit, sediment or other foreign solid matter being, of course, thrown outwardly by centrifugal force and accumulating at the outside of the conical end instead of passing through the central orifice 4.

In lieu of using the elbow, I may interpose between the line 10 and the device, a spiral feed member 11 which may, in actual practice, consist of a suitable length of pipe provided internally with one or more flutes or spiral ribs 12 which will act to impart a whirling motion to the liquid as it approaches the conical end of the tubular member. The effect is the same in either instance and actual experiment has demonstrated that the liquid passing through the device is free from sediment and other foreign matter, such material accumulating upon the conical surface of the end. In the course of time, when the accumulation upon the conical end becomes excessive, it is of course necessary to remove it but this is an extremely simple matter and one which may be attended to very readily.

While I have shown and described the device simply in combination with a turbulence producing means and have not illustrated any particular device with which the structure may be used, it will be apparent that it could be used in the oil feed line to a furnace and when so used it will act to prevent clogging of the burner or burners. The same is true if the device is employed in advance of the carbureter of a motor or the like. In fact there are many uses to which the device may be put in a wide variety of arts. It is furthermore to be understood that I reserve the right to make all such changes in the size, shape and detailed construction of the device itself and in the nature of the turbulence producing means thereadjacent, to widen the field of utility and increase the adaptability of the device, provided such variations constitute no departure from the spirit of the invention or the scope of the claims hereunto appended.

Having thus described the invention, I claim:

1. Liquid purifying means comprising the combination of a tubular member interposed in a liquid conduit and having its end toward the liquid current provided with a central orifice of relatively small diameter as compared with the tubular member itself, the remainder of said end being imperforate, and means located in advance of said tubular member for producing turbulence of the liquid.

2. A liquid purifying device comprising a tubular member interposed in a liquid conduit and having its end toward the current tapered and formed with a single, central relatively small orifice as compared with the diameter of the tubular member itself, the remainder of said end being imperforate and smooth.

3. A liquid purifying device comprising a tubular member interposed in a liquid conduit and having its end toward the current tapered to a substantial point and formed at its apex with a single relatively small orifice as compared with the diameter of the tubular member itself, and means interposed in the conduit in advance of said tubular member for producing turbulence of the liquid.

4. A liquid purifying device comprising a tubular member interposed in a liquid conduit and having its end toward the current tapered and formed with a single, central relatively small orifice as compared with the diameter of the tubular member itself, and means arranged in the conduit in advance of said tubular member for creating an eddy current about the tapered end of the tubular member.

5. A liquid purifying device comprising the combination with a liquid conduit, of a tubular member interposed therein and having one end of conical formation and closed except for a relatively small central orifice as compared with the diameter of the tubular member, and means in the conduit in advance of and adjacent said tubular member for diverting the liquid from a straight course whereby to produce an eddy current about the conical end of the tubular member.

6. Liquid purifying means comprising the combination with a conduit, of a tubular member interposed therein and having its end opposing the flow of liquid of conical shape to define an annular space about said end and between it and the wall of the conduit, said conical end being formed at its apex with a relatively small opening as compared with the diameter of the tubular member, and means interposed in the conduit in advance of said tubular member for swirling the liquid and causing the same to impinge against the imperforate portion of said conical end.

7. Liquid purifying means comprising the combination with a conduit, of a tubular member interposed therein and having its end opposing the flow of liquid of conical shape to define an annular space about said end and between it and the wall of the conduit, said conical end being formed at its apex with a relatively small opening as compared with the diameter of the tubular member, and means interposed in the conduit in advance of said tubular member for swirling the liquid and causing the same to impinge against the imperforate portion of said conical end, said means comprising spiral ribs on the interior of the conduit.

In testimony whereof I affix my signature.

OSCAR CHRISTENSEN.